United States Patent
Verma et al.

(10) Patent No.: US 10,833,973 B1
(45) Date of Patent: Nov. 10, 2020

(54) ENABLING SELECTION OF A BYPASS PATH FROM AVAILABLE PATHS IN AN OPEN SHORTEST PATH FIRST (OSPF) DOMAIN AND AN INTERMEDIATE SYSTEM TO INTERMEDIATE SYSTEM (ISIS) DOMAIN

(71) Applicant: Juniper Networks, Inc., Sunnyvale, CA (US)

(72) Inventors: Krishna K Verma, Milpitas, CA (US); Nischal Singh, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/277,642

(22) Filed: Feb. 15, 2019

(51) Int. Cl.
  *H04L 12/721* (2013.01)
  *H04L 12/707* (2013.01)
  *H04L 12/913* (2013.01)
  *H04L 12/751* (2013.01)
  *H04L 12/703* (2013.01)

(52) U.S. Cl.
  CPC .............. *H04L 45/12* (2013.01); *H04L 45/02* (2013.01); *H04L 45/22* (2013.01); *H04L 45/28* (2013.01); *H04L 47/724* (2013.01)

(58) Field of Classification Search
  CPC ......... H04L 45/50; H04L 45/22; H04L 45/28; H04L 47/724; H04L 45/02; H04L 41/0668
  See application file for complete search history.

(56) References Cited

U.S. PATENT DOCUMENTS

| 2002/0004843 | A1* | 1/2002 | Andersson | H04L 45/00 709/238 |
| 2013/0010589 | A1* | 1/2013 | Kini | H04L 45/50 370/219 |
| 2014/0029418 | A1* | 1/2014 | Jain | H04L 45/28 370/228 |
| 2014/0146664 | A1* | 5/2014 | Amante | H04L 45/50 370/228 |
| 2015/0215200 | A1* | 7/2015 | Bottari | H04Q 3/0079 370/228 |
| 2016/0134607 | A1* | 5/2016 | Liu | H04L 63/08 726/6 |

* cited by examiner

*Primary Examiner* — Asad M Nawaz
*Assistant Examiner* — Najeeb Ansari
(74) *Attorney, Agent, or Firm* — Harrity & Harrity, LLP

(57) ABSTRACT

A network device receives an attribute identifying paths associated with an open shortest path first (OSPF) domain of a network and an intermediate system to intermediate system (ISIS) domain of the network, and provides the attribute to other network devices of the network. The network device receives traffic destined for one of the other network devices of the network, and determines that a primary path is unavailable for routing the traffic to the one of the other network devices. The network device selects a secondary path from the paths identified by the attribute. The secondary path is selected based on determining that the primary path is unavailable, and the secondary path is associated with the OSPF domain or the ISIS domain of the network. The network device provides the traffic to the one of the other network devices via the secondary path.

17 Claims, 12 Drawing Sheets

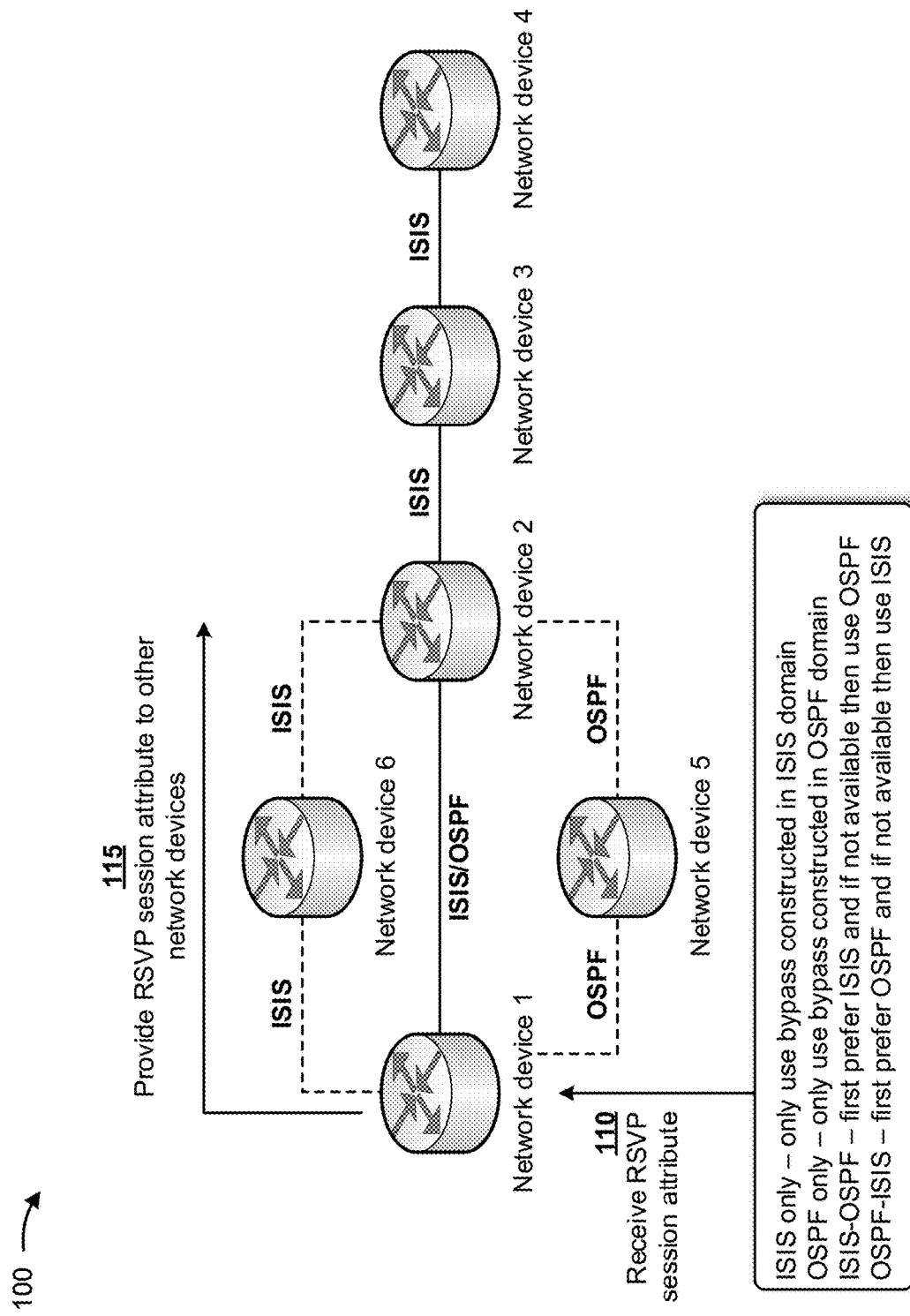

ENABLING SELECTION OF A BYPASS PATH FROM AVAILABLE PATHS IN AN OPEN SHORTEST PATH FIRST (OSPF) DOMAIN AND AN INTERMEDIATE SYSTEM TO INTERMEDIATE SYSTEM (ISIS) DOMAIN

BACKGROUND

Network devices may be utilized in a multi-topology network. For example, the multi-topology network may include clusters of network devices and each cluster of network devices may utilize an open shortest path first (OSPF) protocol (e.g., as an intra-cluster interior gateway protocol (IGP)). The multi-topology network may utilize an intermediate system to intermediate system (ISIS) protocol across the clusters (e.g., as an inter-cluster IGP).

SUMMARY

In some aspects, a method may include receiving an attribute identifying paths associated with an open shortest path first (OSPF) domain of a network and an intermediate system to intermediate system (ISIS) domain of the network, and providing the attribute to other network devices of the network. The method may include receiving traffic destined for one of the other network devices of the network, and determining that a primary path is unavailable for routing the traffic to the one of the other network devices. The method may include selecting a secondary path from the paths identified by the attribute. The secondary path may be selected based on determining that the primary path is unavailable for routing the traffic to the one of the other network devices, and the secondary path may be associated with one of the OSPF domain of the network or the ISIS domain of the network. The method may include providing the traffic to the one of the other network devices via the secondary path.

In some aspects, a network device may include one or more memories and one or more processors to receive an attribute identifying paths associated with an open shortest path first (OSPF) domain of a network and an intermediate system to intermediate system (ISIS) domain of the network, and receive traffic destined for one of other network devices of the network. The one or more processors may determine whether a primary path is available for routing the traffic to the one of the other network devices, and may selectively provide the traffic to the one of the other network devices via the primary path or via a secondary path. The traffic may be provided to the one of the other network devices via the primary path when the primary path is available for routing the traffic to the one of the other network devices. The traffic may be provided to the one of the other network devices via the secondary path when the primary path is unavailable for routing the traffic to the one of the other network devices. The secondary path may be selected from the paths identified by the attribute, and the secondary path may be associated with one of the OSPF domain of the network or the ISIS domain of the network.

In some aspects, a non-transitory computer-readable medium may store instructions that include one or more instructions that, when executed by one or more processors of a network device, cause the one or more processors to receive an attribute identifying paths associated with an open shortest path first (OSPF) domain of a network and an intermediate system to intermediate system (ISIS) domain of the network. The one or more instructions may cause the one or more processors to receive traffic destined for one of other network devices of the network, and determine that a primary path is unavailable for routing the traffic to the one of the other network devices. The one or more instructions may cause the one or more processors to select a secondary path from the paths identified in the attribute. The secondary path may be selected based on determining that the primary path is unavailable for routing the traffic to the one of the other network devices, and the secondary path may be associated with one of the OSPF domain of the network or the ISIS domain of the network. The one or more instructions may cause the one or more processors to provide the traffic to the one of the other network devices via the secondary path.

BRIEF DESCRIPTION OF THE DRAWINGS

FIGS. 1A-1G are diagrams of one or more example implementations described herein.

DETAILED DESCRIPTION

The following detailed description of example implementations refers to the accompanying drawings. The same reference numbers in different drawings may identify the same or similar elements.

A multi-topology network fails to utilize resource reservation protocol (RSVP) multiprotocol label switching (MPLS) label-switched paths (LSPs) within clusters of network devices and across clusters of network devices. For example, intra-cluster LSPs start and end within the OSPF domain and inter-cluster LSPs span across the ISIS domain for inter-cluster connectivity. However, when link protection is enabled for intra-cluster LSPs and inter-cluster LSPs, a primary LSP is unable to choose a bypass (or secondary) path, from available bypass paths, based on the two different link state protocols (e.g., OSPF and ISIS), and the primary LSP is unable to signal the bypass path to other network devices based on the two different link state protocols.

Some implementations described herein provide a network device that enables selection of a bypass path, such as a resource reservation protocol (RSVP) label-switched path (LSP), from available paths in an open shortest path first (OSPF) domain and an intermediate system to intermediate system (ISIS) domain. For example, the network device may receive an attribute identifying paths associated with an OSPF domain of a network and an ISIS domain of the network, and may provide the attribute to other network devices of the network. The network device may receive traffic destined for one of the other network devices of the network, and may determine that a primary path is unavailable for routing the traffic to the one of the other network devices. The network device may select a secondary path from the paths identified by the attribute. The secondary path may be selected based on determining that the primary path is unavailable, and the secondary path may be associated with the OSPF domain or the ISIS domain of the network. The network device may provide the traffic to the one of the other network devices via the secondary path.

In this way, traffic may be continuously routed in a multi-topology network, which reduces or prevents traffic outages in the multi-topology network (e.g., that cause traffic to be lost, cause traffic to be delayed, require re-routing of traffic, and/or the like). This, in turn, conserves computing resources (e.g., processing resources, memory resources, and/or the like), networking resources, and/or the like that would otherwise be wasted in identifying and/or correcting the traffic outage, re-routing traffic, locating lost traffic, and/or the like.

Figure 1A:
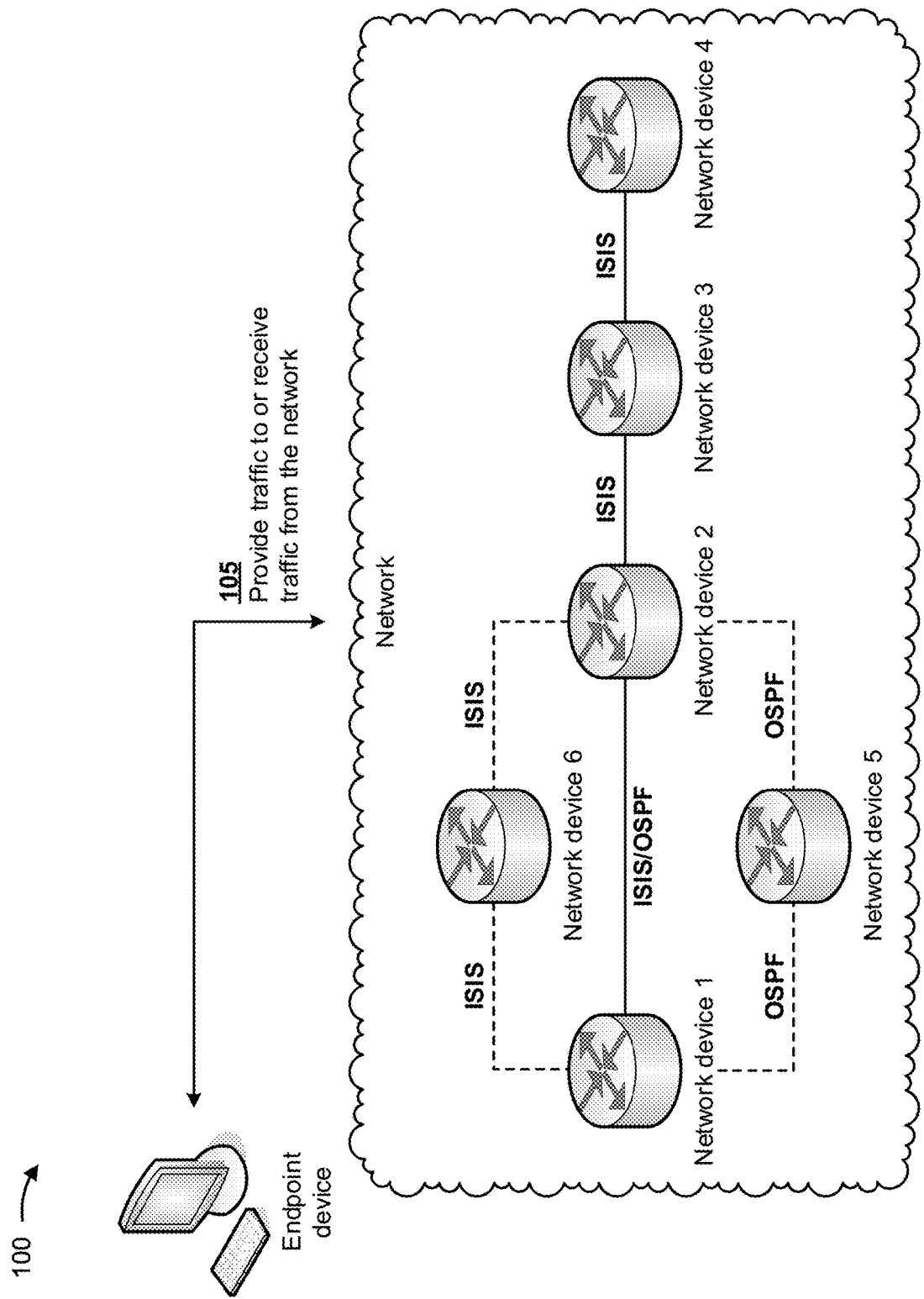

FIGS. 1A-1G are diagrams of one or more example implementations 100 described herein. As shown in FIG. 1A, an endpoint device may be associated with a network. As further shown in FIG. 1A, the network may include multiple network devices, such as a first network device (e.g., network device 1), a second network device (e.g., network device 2), a third network device (e.g., network device 3), a fourth network device (e.g., network device 4), a fifth network device (e.g., network device 5), a sixth network device (e.g., network device 6), and/or the like. The six network devices shown in FIGS. 1A-1G are provided merely as examples of network devices, and, in practice, the network may include additional network devices.

In some implementations, the network may be a multi-topology network that includes clusters of network devices and each cluster of network devices may utilize an OSPF protocol (e.g., as an intra-cluster IGP). The multi-topology network may utilize an ISIS protocol across the clusters (e.g., as an inter-cluster IGP). For example, the ISIS protocol may be utilized by links between the first network device and the sixth network device, the sixth network device and the second network device, the second network device and the third network device, and the third network device and the fourth network device. The OSPF protocol may be utilized by links between the first network device and the second network device, the first network device and the fifth network device, and the fifth network device and the second network device.

As further shown in FIG. 1A, and by reference number 105, the endpoint device may provide traffic to and/or receive traffic from the network. In some implementations, the traffic from the endpoint device may be provided to one or more of the network devices and the one or more of the network devices may process the traffic accordingly (e.g., by forwarding the traffic to other network devices and/or endpoint devices). In some implementations, traffic may be processed by one or more network devices and forwarded to the endpoint device.

As shown in FIG. 1B, and by reference number 110, the first network device may receive an RSVP session attribute. The RSVP session attribute may be received from a network controller device, another network device, and/or the like. The RSVP session attribute may not be utilized with all traffic, may be utilized for a particular class of traffic, may be utilized for a particular priority of traffic, may be utilized for a particular destination of traffic, may be utilized for a particular source of traffic, and/or the like. In some implementations, the first network device may determine the RSVP session attribute rather than receiving RSVP session attribute. The the first network device may determine the RSVP session attribute based on any one or more of a particular class of traffic, a particular priority of traffic, a particular destination of traffic, a particular source of traffic, a topology of the network, attributes of other network devices in the network, historical traffic received by the first network device, quality of service (QoS) requirements, network performance requirements, and/or the like. In some implementations, the first network device may utilize the aforementioned information with a machine learning model to identify the RSVP session attribute. While implementations are described herein in terms of RSVP, ISIS, and OSPF as example protocols, in some implementations, protocols other than RSVP, ISIS, and/or OSPF may be utilized.

The RSVP session attribute may include information identifying, to the first network device, bypass RSVP LSPs available in the OSPF domain and the ISIS domain. For example, the RSVP session attribute may include an indication (e.g., "ISIS only") indicating that the first network device is to use only a bypass RSVP LSP that utilizes the ISIS protocol; an indication (e.g., "OSPF only") indicating that the first network device is to use only a bypass RSVP LSP that utilizes the OSPF protocol; an indication (e.g., "ISIS-OSPF") indicating that the first network device is first to use a bypass RSVP LSP that utilizes the ISIS protocol when available, or, if not available, a bypass RSVP LSP that utilizes the OSPF protocol; an indication (e.g., "OSPF-ISIS") indicating that the first network device is first to use a bypass RSVP LSP that utilizes the OSPF protocol when available, or, if not available, a bypass RSVP LSP that utilizes the ISIS protocol, and/or the like.

As further shown in FIG. 1B, and by reference number 115, the first network device may provide the RSVP session attribute to the other network devices of the network. For example, the first network device may provide, to the other network devices and based on the RSVP session attribute, a signal indicating that the first network device is in a particular domain (e.g., the ISIS domain, the OSPF domain, the ISIS-OSPF domain, or the OSPF-ISIS domain) and needs a bypass RSVP LSP that uses the appropriate protocol. In some implementations, each network device of the network may provide RSVP session attributes to the other network devices of the network, and the other network devices may store the RSVP session attributes in association with information identifying the network device that provided the RSVP session attributes. In some implementations, the RSVP session attributes for the bypass RSVP LSPs may be stored in a data structure (e.g., a database, a table, a list, and/or the like) that is shared among the network devices of the network.

Figure 1C:
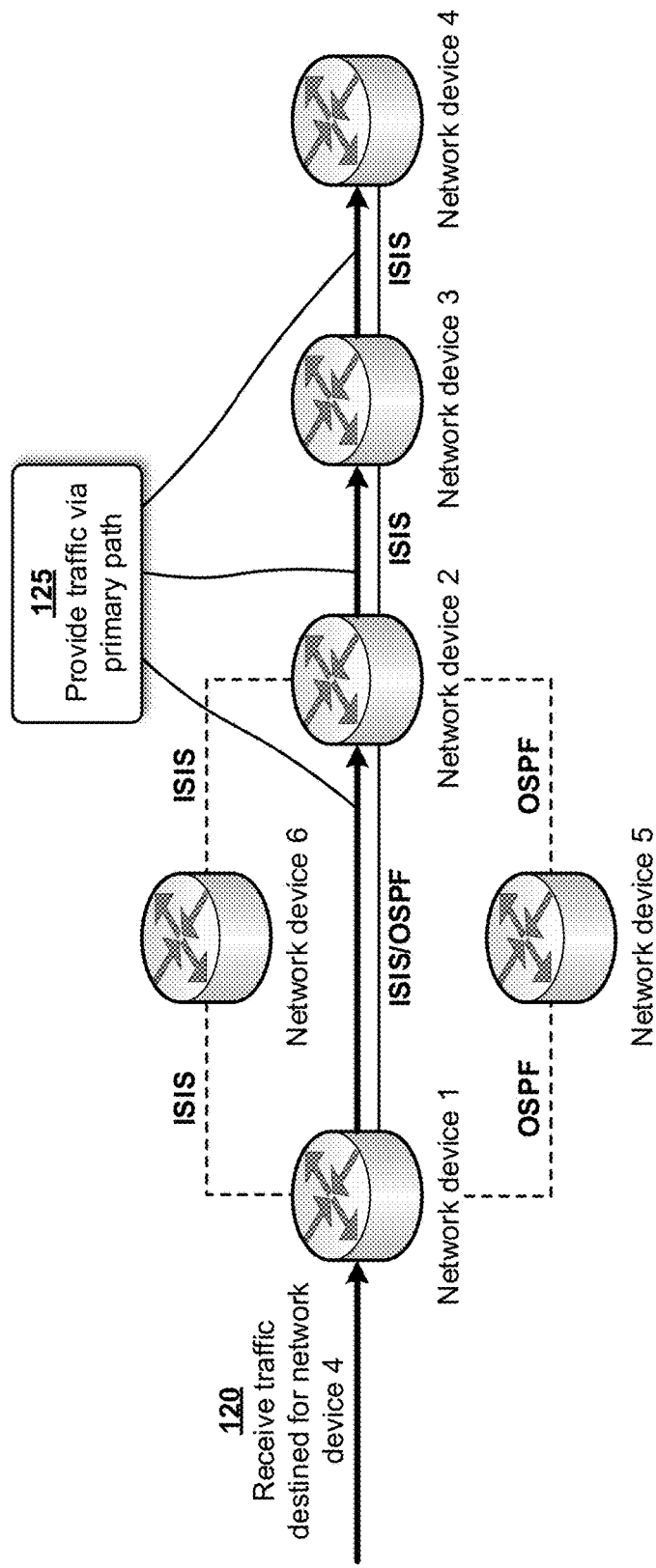

As shown in FIG. 1C, and by reference number 120, the first network device may receive traffic destined for the fourth network device. The traffic may be received from the endpoint device, as shown in FIG. 1A. If all links of a primary path for the traffic are available, the first network device may provide the traffic to the fourth network device via the primary path. For example, as shown in FIG. 1C, and by reference number 125, the first network device may provide the traffic via the primary path to the fourth network device. The primary path may include the link between the first network device and the second network device, the link between the second network device and the third network device, and the link between the third network device and the fourth network device.

Figure 1D:
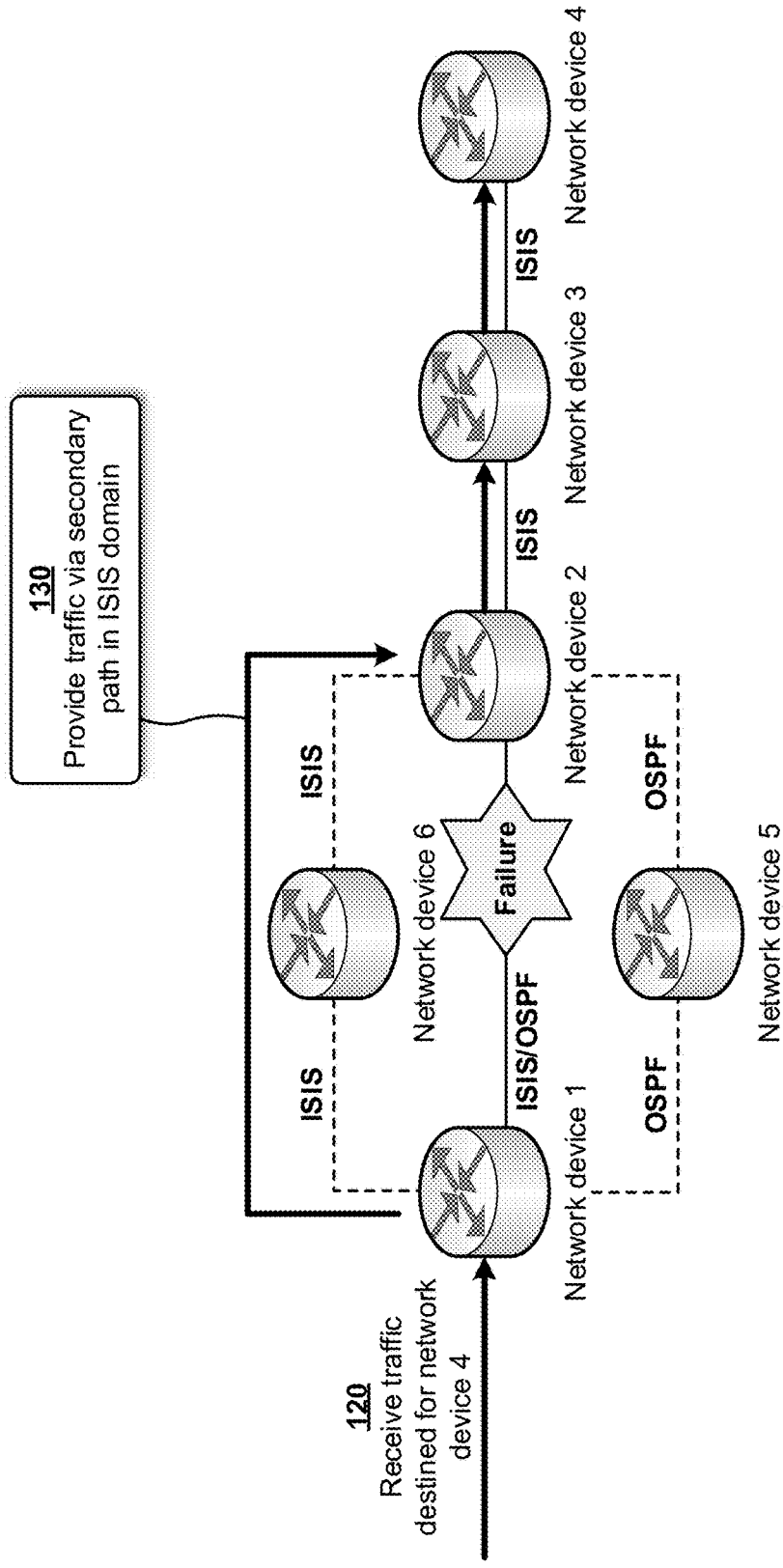

As shown in FIG. 1D, assume that a failure occurs at the link provided between the first network device and the second network device. Because of the failure, the primary path for the traffic may be unavailable to the first network device. Since all links of the primary path for the traffic are not available, the first network device may determine a secondary path (e.g., a bypass path) for the traffic based on the RSVP session attribute. For example, if the RSVP session attribute includes the indication (e.g., "ISIS only" or "ISIS-OSPF") indicating that the first network device is to use a bypass RSVP LSP that utilizes the ISIS protocol only or before considering whether to use a bypass RSVP LSP that utilizes the OSPF protocol, the first network device may identify the link between the first network device and the sixth network device and the link between the sixth network device and the second network device as the secondary path. As another example, if the RSVP session attribute includes the indication (e.g., "OSPF only" or "OSPF-ISIS") indicating that the first network device is to use a bypass RSVP LSP that utilizes the OSPF protocol only or before considering whether to use a bypass RSVP LSP that utilizes the ISIS protocol, the first network device may identify the link between the first network device and the fifth network device and the link between the fifth network device and the second network device as the secondary path.

As further shown in FIG. 1D, and by reference number 130, the first network device may provide the traffic via the secondary path in the ISIS domain to the fourth network device. For example, the first network device may provide the traffic to the fourth network device via the link between the first network device and the sixth network device, the link between the sixth network device and the second network device, the link between the second network device and the third network device, and the link between the third network device and the fourth network device.

Figure 1E:
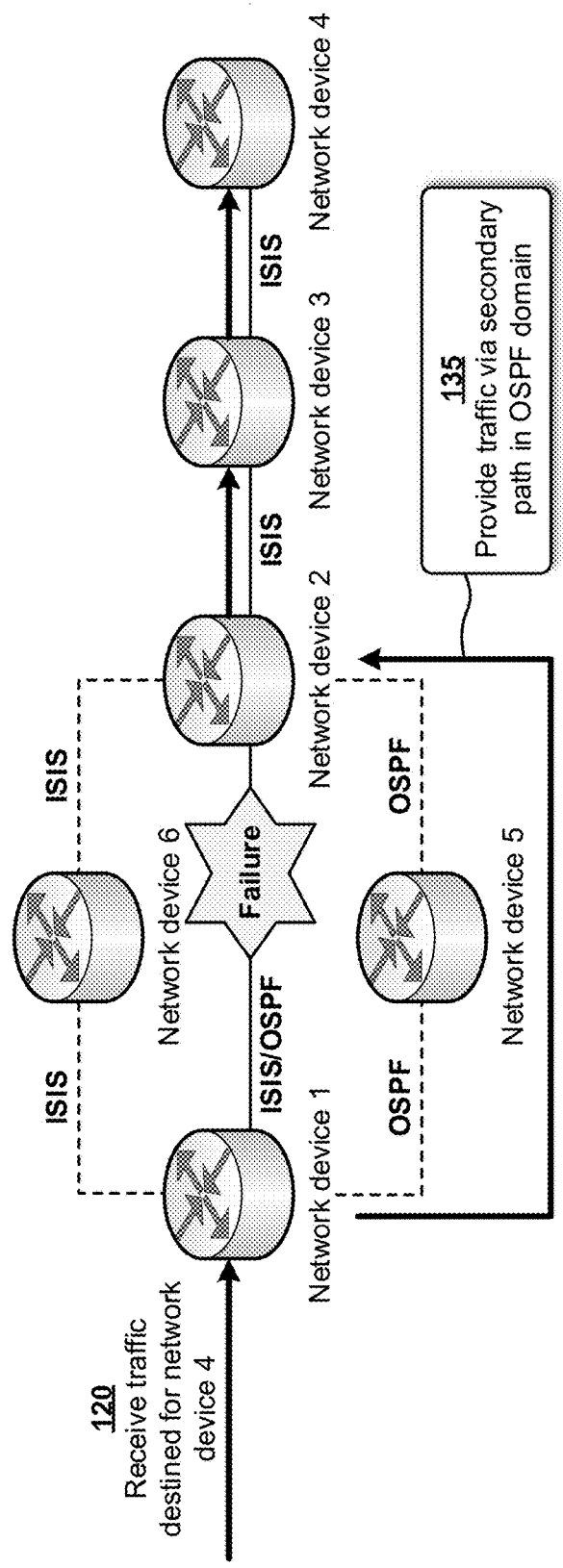

With reference to FIG. 1E, if the RSVP session attribute includes the indication (e.g., "OSPF only") indicating that the first network device is to use only a bypass RSVP LSP that utilizes the OSPF protocol, the first network device may identify the link between the first network device and the fifth network device and the link between the fifth network device and the second network device as the secondary path.

As shown in FIG. 1E, and by reference number 135, the first network device may provide the traffic via the secondary path in the OSPF domain to the fourth network device. For example, the first network device may provide the traffic to the fourth network device via the link between the first network device and the fifth network device, the link between the fifth network device and the second network device, the link between the second network device and the third network device, and the link between the third network device and the fourth network device.

Figure 1F:
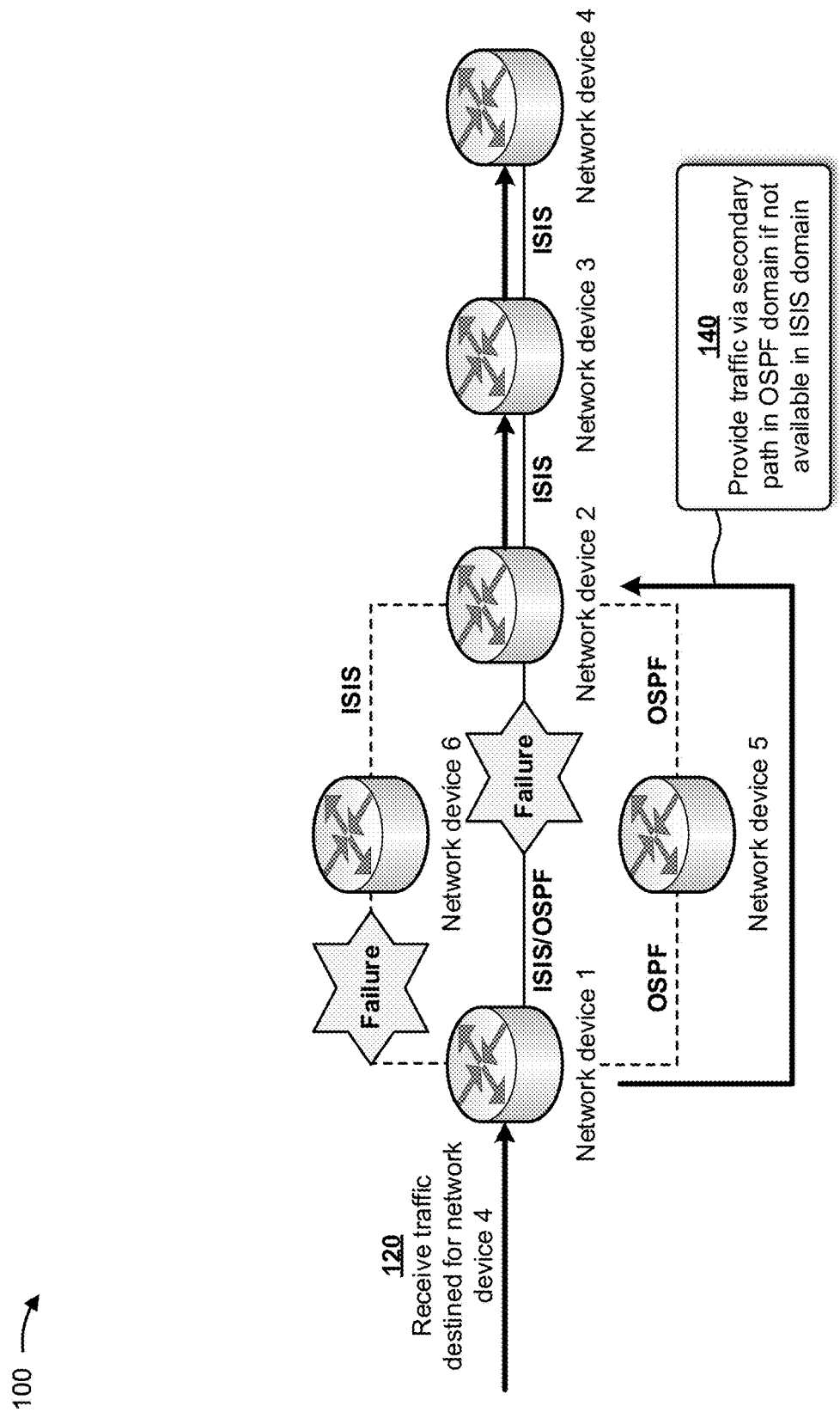

As shown in FIG. 1F, assume that a failure occurs at the link provided between the first network device and the sixth network device. If the RSVP session attribute includes the indication (e.g., "OSPF only") indicating that the first network device is to use only a bypass RSVP LSP that utilizes the OSPF protocol, the failure may not affect the identification of the secondary path and the first network device may identify the link between the first network device and the fifth network device and the link between the fifth network device and the second network device as the secondary path.

However, if the RSVP session attribute includes the indication (e.g., "ISIS-OSPF") indicating that the first network device is first to use a bypass RSVP LSP that utilizes the ISIS protocol when available, or, if not available, a bypass RSVP LSP that utilizes the OSPF protocol, the first network device may first attempt to identify the link between the first network device and the sixth network device and the link between the sixth network device and the second network device as the secondary path. Such a secondary path may be unavailable due to the failure of the link between the first network device and the sixth network device. Thus, the first network device may identify the link between the first network device and the fifth network device and the link between the fifth network device and the second network device as the secondary path.

As further shown in FIG. 1F, and by reference number 140, the first network device may provide the traffic via the secondary path in the OSPF domain to the fourth network device (e.g., when the RSVP session attribute includes the "OSPF only" indication or the "ISIS-OSPF" indication). For example, the first network device may provide the traffic to the fourth network device via the link between the first network device and the fifth network device, the link between the fifth network device and the second network device, the link between the second network device and the third network device, and the link between the third network device and the fourth network device.

Figure 1G:
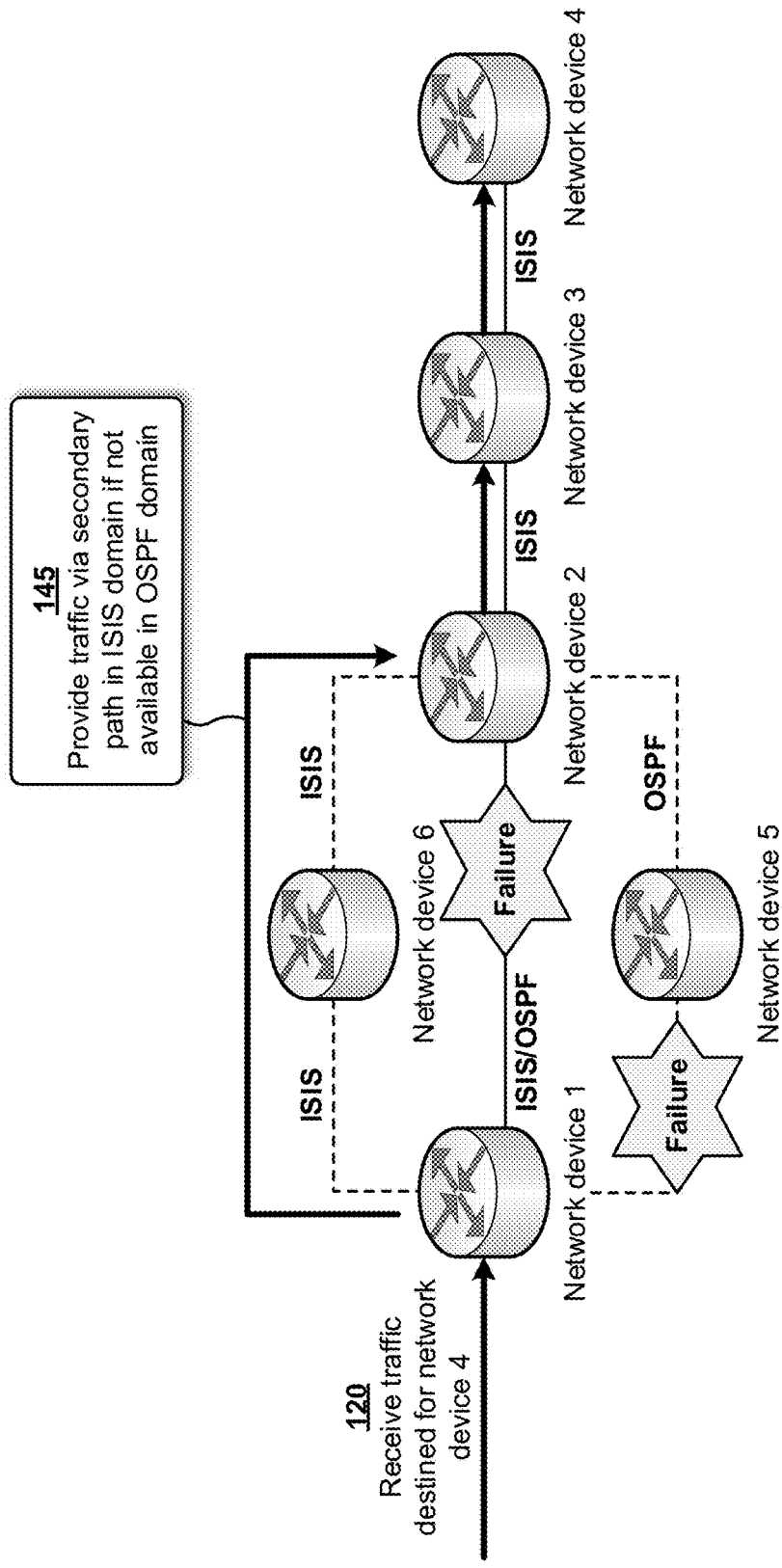

As shown in FIG. 1G, assume that a failure occurs at the link provided between the first network device and the fifth network device. If the RSVP session attribute includes the indication (e.g., "ISIS only") indicating that the first network device is to use only a bypass RSVP LSP that utilizes the ISIS protocol, the failure may not affect the identification of the secondary path and the first network device may identify the link between the first network device and the sixth network device and the link between the sixth network device and the second network device as the secondary path.

However, if the RSVP session attribute includes the indication (e.g., "OSPF-ISIS") indicating that the first network device is first to use a bypass RSVP LSP that utilizes the OSPF protocol when available, or, if not available, a bypass RSVP LSP that utilizes the ISIS protocol, the first network device may first attempt to identify the link between the first network device and the fifth network device and the link between the fifth network device and the second network device as the secondary path. Such a secondary path may be unavailable due to the failure of the link between the first network device and the fifth network device. Thus, the first network device may identify the link between the first network device and the sixth network device and the link between the sixth network device and the second network device as the secondary path.

As further shown in FIG. 1G, and by reference number 145, the first network device may provide the traffic via the secondary path in the ISIS domain to the fourth network device (e.g., when the RSVP session attribute includes the "ISIS only" indication or the "OSPF-ISIS" indication). For example, the first network device may provide the traffic to the fourth network device via the link between the first network device and the sixth network device, the link between the sixth network device and the second network device, the link between the second network device and the third network device, and the link between the third network device and the fourth network device.

In this way, traffic may be continuously routed in a multi-topology network, which reduces or prevents traffic outages in the multi-topology network (e.g., that cause traffic to be lost, cause traffic to be delayed, require re-routing of traffic, and/or the like). This conserves computing resources (e.g., processing resources, memory resources, and/or the like), networking resources, and/or the like that would otherwise be wasted in identifying and/or correcting the traffic outage, re-routing traffic, locating lost traffic, and/or the like. Furthermore, implementations described herein use a rigorous, computerized process to perform tasks that were not previously performed. For example, currently there does not exist a technique that enables selection of a bypass RSVP LSP from available paths in an OSPF domain and an ISIS domain, and that signals RSVP session attributes (e.g., identifying RSVP LSPs) to network devices.

As indicated above, FIGS. 1A-1G are provided merely as examples. Other examples may differ from what is described with regard to FIGS. 1A-1G.

Figure 2:
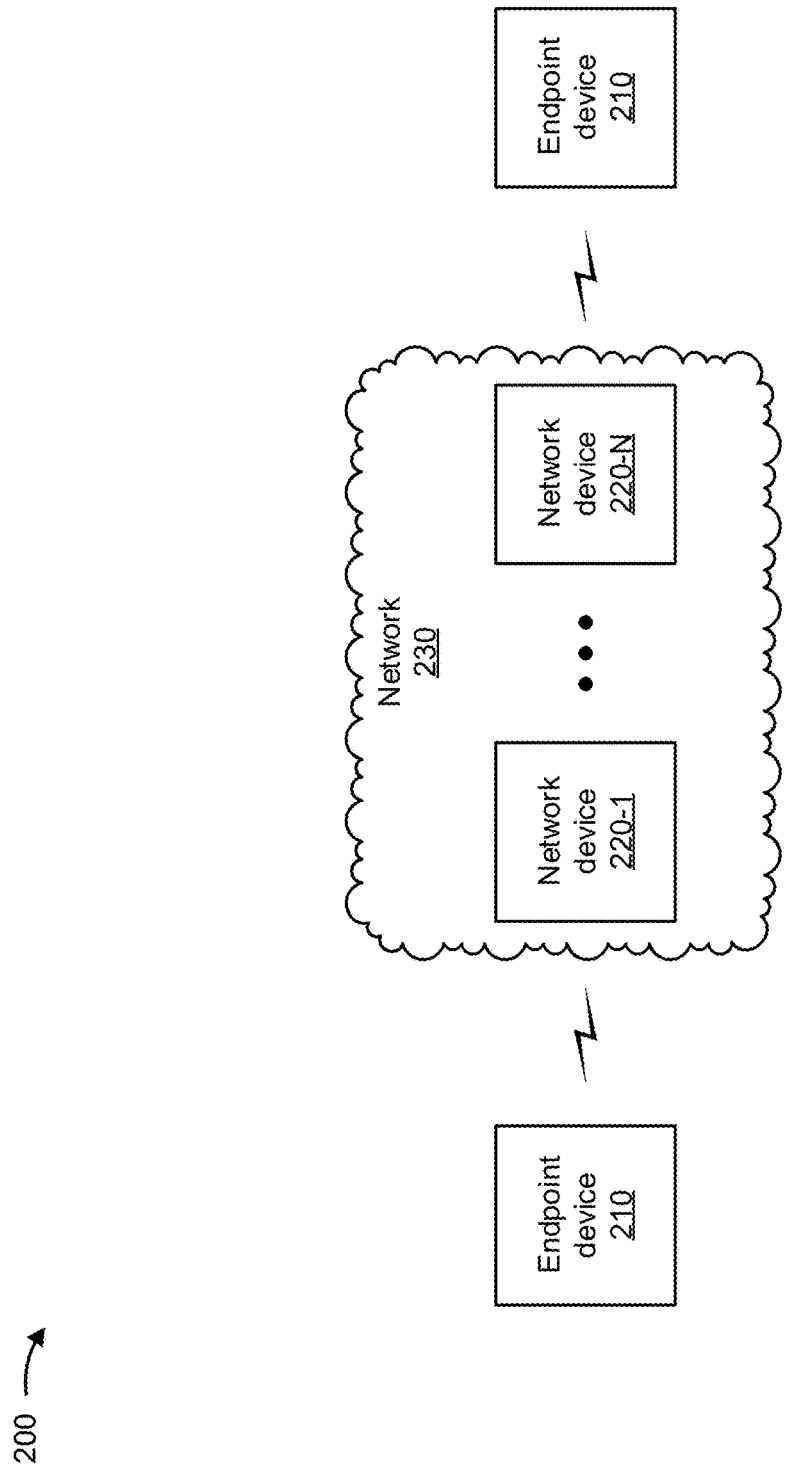
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
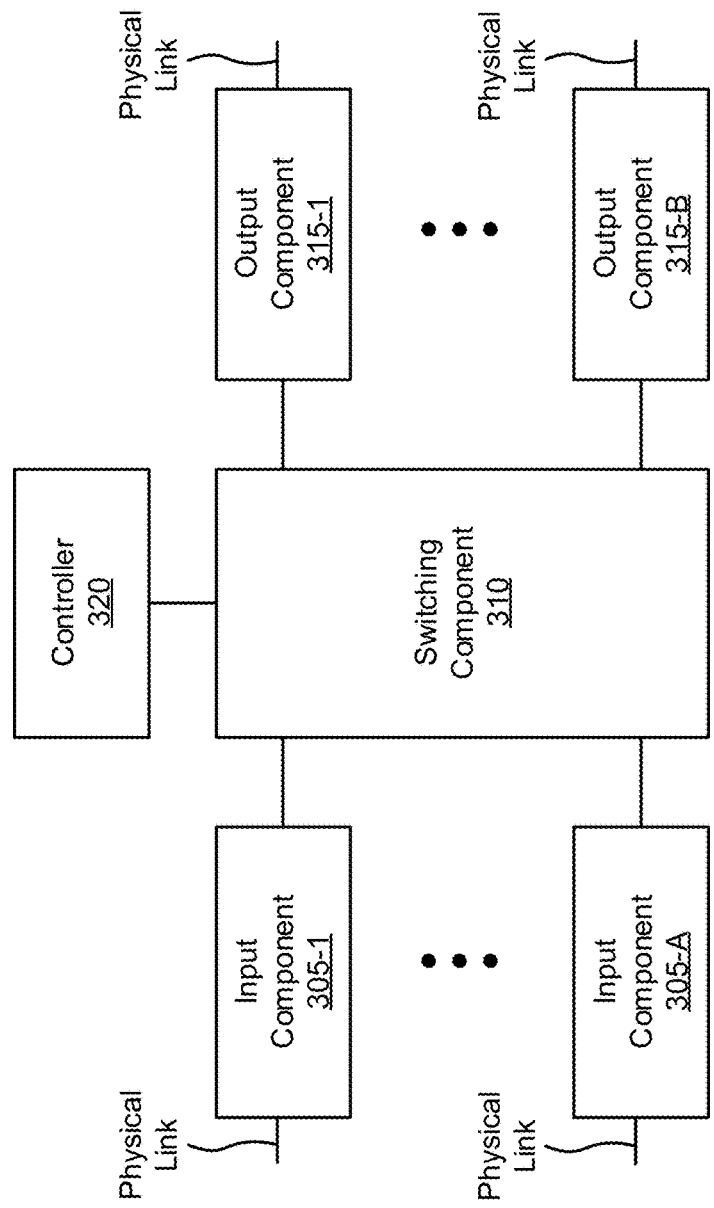
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session, and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
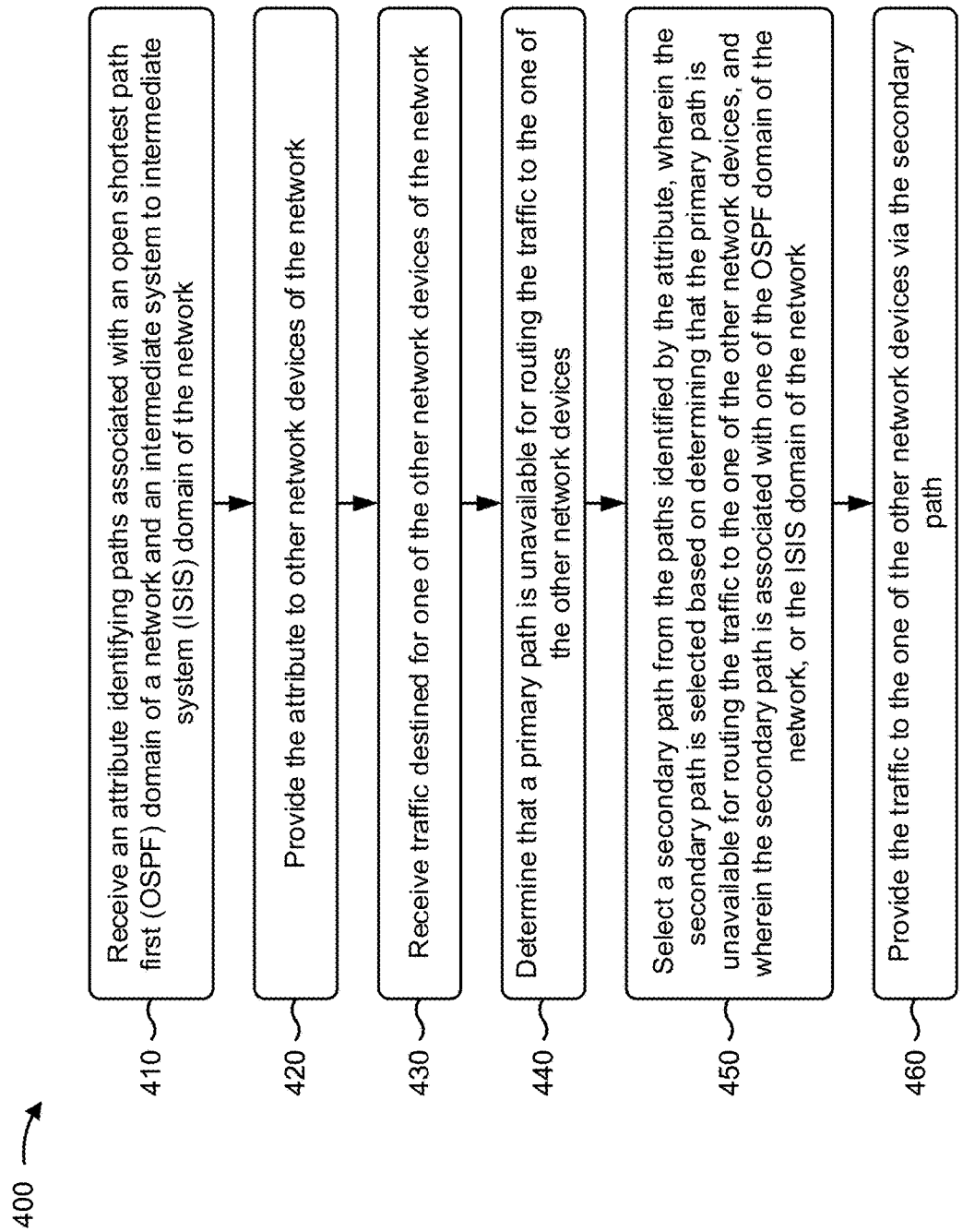
FIGS. 4-6 are flow charts of example processes for enabling selection of a bypass path from available paths in an open shortest path first (OSPF) domain and an intermediate system to intermediate system (ISIS) domain.

FIG. 4 is a flow chart of an example process 400 for enabling selection of a bypass path from available paths in an OSPF domain and an ISIS domain. In some implementations, one or more process blocks of FIG. 4 may be performed by a network device (e.g., network device 220). In some implementations, one or more process blocks of FIG. 4 may be performed by another device or a group of devices separate from or including the network device, such as an endpoint device (e.g., endpoint device 210).

As shown in FIG. 4, process 400 may include receiving an attribute identifying paths associated with an open shortest path first (OSPF) domain of a network and an intermediate system to intermediate system (ISIS) domain of the network (block 410). For example, the network device (e.g., using input component 305, switching component 310, controller 320, and/or the like) may receive an attribute identifying paths associated with an OSPF domain of a network and an ISIS domain of the network, as described above in connection with FIGS. 1A-2.

As further shown in FIG. 4, process 400 may include providing the attribute to other network devices of the network (block 420). For example, the network device (e.g., switching component 310, output component 315, controller 320, and/or the like) may provide the attribute to other network devices of the network, as described above in connection with FIGS. 1A-2.

As further shown in FIG. 4, process 400 may include receiving traffic destined for one of the other network devices of the network (block 430). For example, the network device (e.g., input component 305, switching component 310, controller 320, and/or the like) may receive traffic destined for one of the other network devices of the network, as described above in connection with FIGS. 1A-2.

As further shown in FIG. 4, process 400 may include determining that a primary path is unavailable for routing the traffic to the one of the other network devices (block 440). For example, the network device (e.g., switching component 310, controller 320, and/or the like) may determine that a primary path is unavailable for routing the traffic to the one of the other network devices, as described above in connection with FIGS. 1A-2.

As further shown in FIG. 4, process 400 may include selecting a secondary path from the paths identified by the attribute, wherein the secondary path is selected based on determining that the primary path is unavailable for routing the traffic to the one of the other network devices, and wherein the secondary path is associated with one of the OSPF domain of the network or the ISIS domain of the network (block 450). For example, the network device (e.g., switching component 310, controller 320, and/or the like) may select a secondary path from the paths identified by the attribute, as described above in connection with FIGS. 1A-2. In some implementations, the secondary path may be selected based on determining that the primary path is unavailable for routing the traffic to the one of the other network devices, and the secondary path may be associated with one of the OSPF domain of the network or the ISIS domain of the network.

As further shown in FIG. 4, process 400 may include providing, by the network device, the traffic to the one of the other network devices via the secondary path (block 460). For example, the network device (e.g., switching component 310, output component 315, controller 320, and/or the like) may provide the traffic to the one of the other network devices via the secondary path, as described above in connection with FIGS. 1A-2.

Process 400 may include additional implementations, such as any single implementation or any combination of implementations described below and/or in connection with one or more other processes described elsewhere herein.

In some implementations, the attribute may include information identifying a first secondary path only in the ISIS domain of the network, a second secondary path only in the OSPF domain of the network, a third secondary path that is in the ISIS domain of the network when the ISIS domain is available or is in the OSPF domain of the network when the ISIS domain is unavailable, a fourth secondary path that is in the OSPF domain of the network when the OSPF domain is available or is in the ISIS domain of the network when the OSPF domain is unavailable, and/or the like.

In some implementations, the attribute may be stored in a data structure associated with the network device and the other network devices, and may include a resource reservation protocol (RSVP) session attribute. In some implementations, the network device may receive additional traffic destined for the one of the other network devices, may determine that the primary path is available for routing the additional traffic to the one of the other network devices, and may provide the additional traffic to the one of the other network devices, via the primary path, based on determining that the primary path is available for routing the additional traffic to the one of the other network devices.

In some implementations, the OSPF domain of the network may include clusters of network devices and intra-cluster paths that utilize an OSPF protocol. In some implementations, the ISIS domain of the network may include inter-cluster paths that utilize an ISIS protocol.

In some implementations, the network device may receive additional traffic destined for the one of the other network devices of the network, and may determine that the primary path is unavailable for routing the additional traffic to the one of the other network devices. The network device may select another secondary path from the paths identified in the attribute. The other secondary path may be different than the secondary path, may be selected based on determining that the primary path is unavailable for routing the additional traffic to the one of the other network devices, and may be associated with one of the OSPF domain of the network or the ISIS domain of the network. The network device may provide the additional traffic to the one of the other network devices via the other secondary path.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
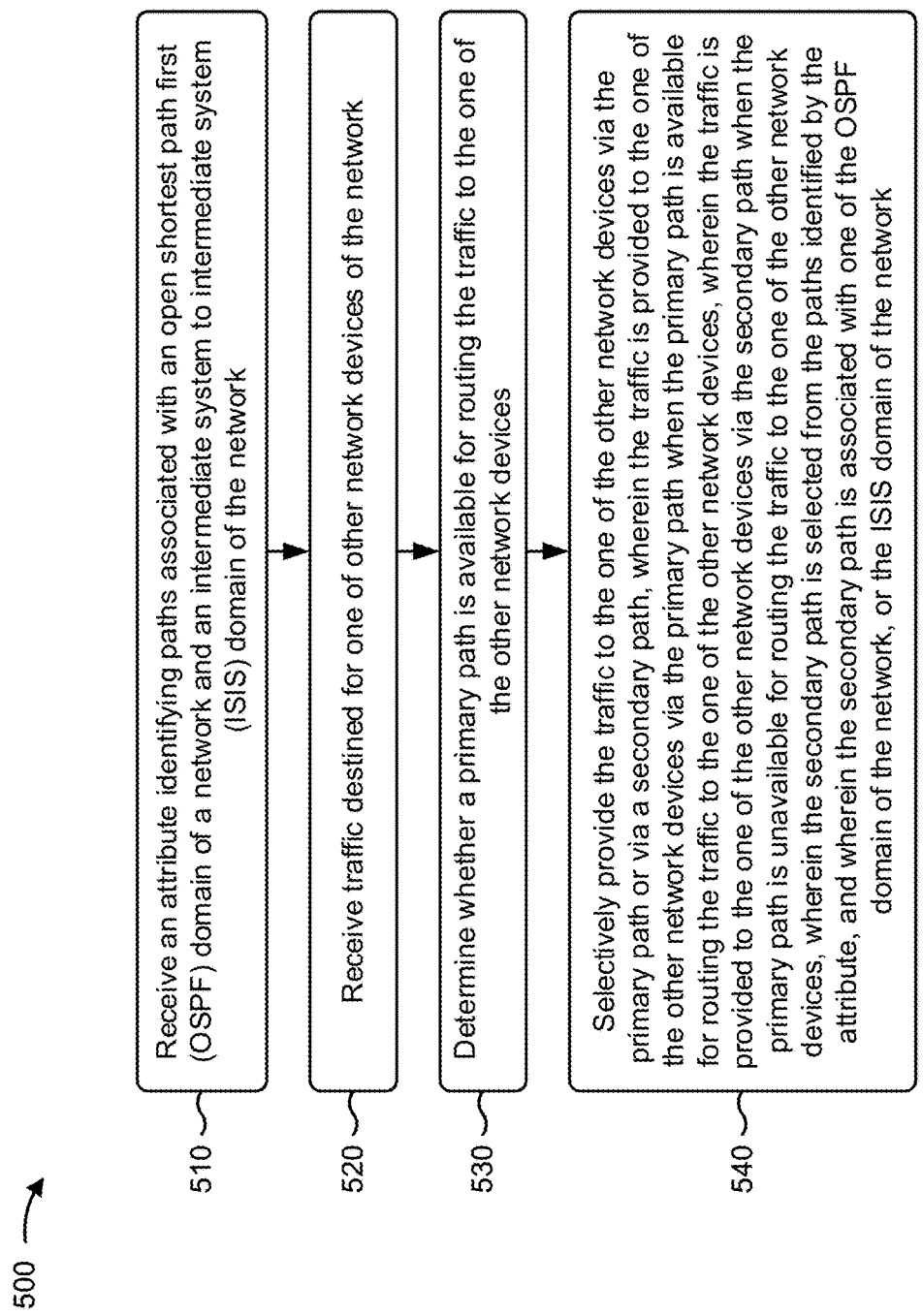

FIG. 5 is a flow chart of an example process 500 for enabling selection of a bypass path from available paths in an OSPF domain and an ISIS domain. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210).

As shown in FIG. 5, process 500 may include receiving an attribute identifying paths associated with an open shortest path first (OSPF) domain of a network and an intermediate system to intermediate system (ISIS) domain of the network (block 510). For example, the network device (e.g., using input component 305, switching component 310, controller 320, and/or the like) may receive an attribute identifying paths associated with an open shortest path first (OSPF) domain of a network and an intermediate system to intermediate system (ISIS) domain of the network, as described above in connection with FIGS. 1A-2.

As further shown in FIG. 5, process 500 may include receiving traffic destined for one of other network devices of the network (block 520). For example, the network device (e.g., using input component 305, switching component 310, controller 320, and/or the like) may receive traffic destined for one of other network devices of the network, as described above in connection with FIGS. 1A-2.

As further shown in FIG. 5, process 500 may include determining whether a primary path is available for routing the traffic to the one of the other network devices (block 530). For example, the network device (e.g., using switching component 310, controller 320, and/or the like) may determine whether a primary path is available for routing the traffic to the one of the other network devices, as described above in connection with FIGS. 1A-2.

As further shown in FIG. 5, process 500 may include selectively providing the traffic to the one of the other network devices via the primary path or via a secondary path, wherein the traffic is provided to the one of the other network devices via the primary path when the primary path is available for routing the traffic to the one of the other network devices, wherein the traffic is provided to the one of the other network devices via the secondary path when the primary path is unavailable for routing the traffic to the one of the other network devices, wherein the secondary path is selected from the paths identified by the attribute, and wherein the secondary path is associated with one of the OSPF domain of the network or the ISIS domain of the network (block 540). For example, the network device (e.g., using switching component 310, output component 315, controller 320, and/or the like) may selectively provide the traffic to the one of the other network devices via the primary path or via a secondary path, as described above in connection with FIGS. 1A-2. In some implementations, the traffic may be provided to the one of the other network devices via the primary path when the primary path is available for routing the traffic to the one of the other network devices. In some implementations, the traffic may be provided to the one of the other network devices via the secondary path when the primary path is unavailable for routing the traffic to the one of the other network devices. In some implementations, the secondary path may be selected from the paths identified by the attribute, and may be associated with one of the OSPF domain of the network or the ISIS domain of the network.

Process 500 may include additional implementations, such as any single implementation or any combination of implementations described below and/or in connection with one or more other processes described elsewhere herein.

In some implementations, the network device may provide the attribute to the other network devices of the network. In some implementations, the attribute may include information identifying a first secondary path only in the ISIS domain of the network, a second secondary path only in the OSPF domain of the network, a third secondary path that is in the ISIS domain of the network when the ISIS domain is available or is in the OSPF domain of the network when the ISIS domain is unavailable, a fourth secondary path that is in the OSPF domain of the network when the OSPF domain is available or is in the ISIS domain of the network when the OSPF domain is unavailable, and/or the like.

In some implementations, the attribute may be stored in a data structure associated with the network device and the other network devices, and may include a resource reservation protocol (RSVP) session attribute. In some implementations, the OSPF domain of the network may include clusters of network devices and intra-cluster paths that utilize an OSPF protocol. In some implementations, the ISIS domain of the network may include inter-cluster paths that utilize an ISIS protocol.

In some implementations, the network device may receive additional traffic destined for the one of the other network devices of the network, and may determine that the primary path is unavailable for routing the additional traffic to the one of the other network devices. The network device may select another secondary path from the paths identified in the attribute. The other secondary path may be different than the secondary path, may be selected based on determining that the primary path is unavailable for routing the additional traffic to the one of the other network devices, and may be associated with one of the OSPF domain of the network or the ISIS domain of the network. The network device may provide the additional traffic to the one of the other network devices via the other secondary path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
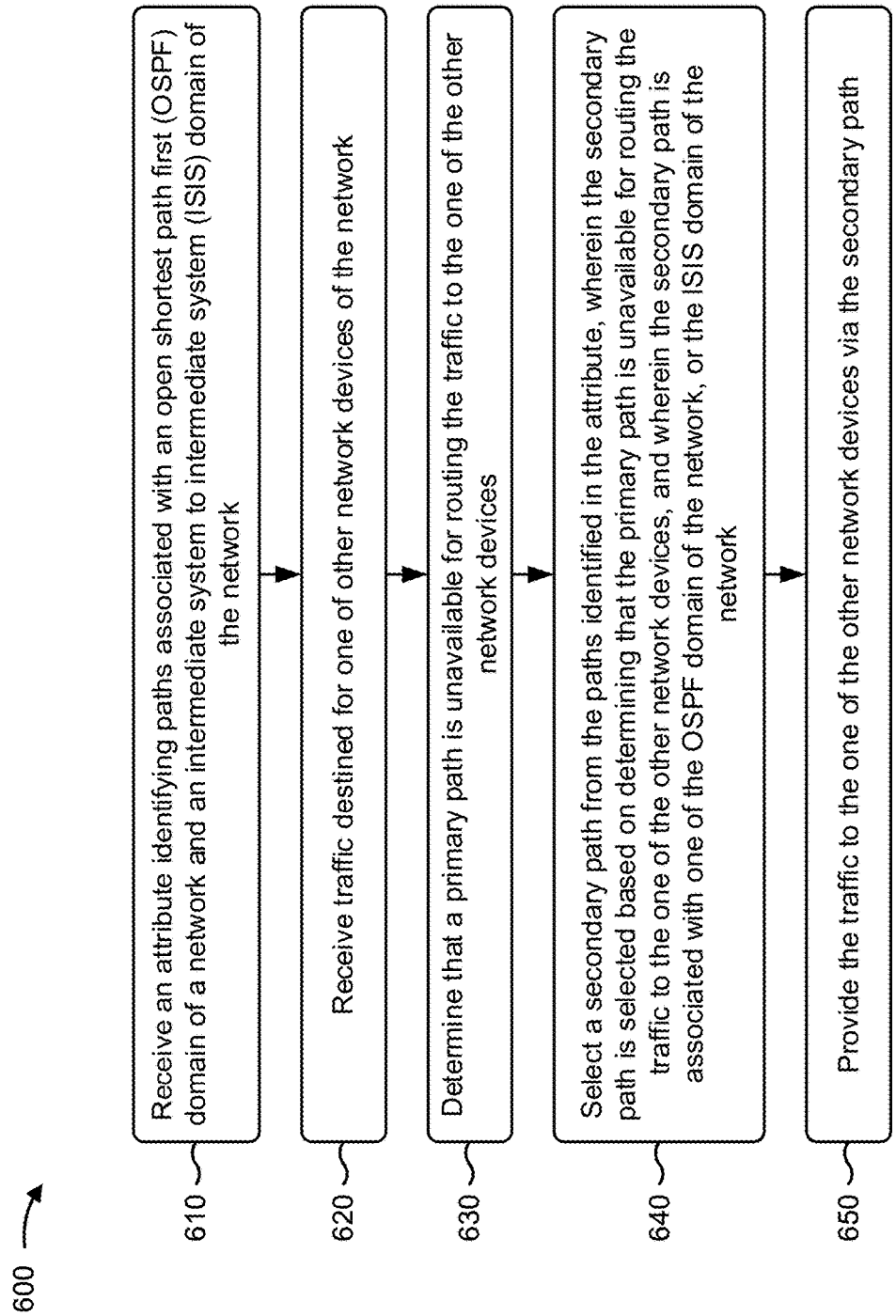

FIG. 6 is a flow chart of an example process 600 for enabling selection of a bypass RSVP LSP from available paths in an OSPF domain and an ISIS domain. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210).

As shown in FIG. 6, process 600 may include receiving an attribute identifying paths associated with an open shortest path first (OSPF) domain of a network and an intermediate system to intermediate system (ISIS) domain of the network (block 610). For example, the network device (e.g., using input component 305, switching component 310, controller 320, and/or the like) may receive an attribute identifying paths associated with an open shortest path first (OSPF) domain of a network and an intermediate system to intermediate system (ISIS) domain of the network, as described above in connection with FIGS. 1A-2.

As further shown in FIG. 6, process 600 may include receiving traffic destined for one of other network devices of the network (block 620). For example, the network device (e.g., using input component 305, switching component 310, controller 320, and/or the like) may receive traffic destined for one of other network devices of the network, as described above in connection with FIGS. 1A-2.

As further shown in FIG. 6, process 600 may include determining that a primary path is unavailable for routing the traffic to the one of the other network devices (block 630). For example, the network device (e.g., using switching component 310, controller 320, and/or the like) may determine that a primary path is unavailable for routing the traffic to the one of the other network devices, as described above in connection with FIGS. 1A-2.

As further shown in FIG. 6, process 600 may include selecting a secondary path from the paths identified in the attribute, wherein the secondary path is selected based on determining that the primary path is unavailable for routing the traffic to the one of the other network devices, and wherein the secondary path is associated with one of the OSPF domain of the network or the ISIS domain of the network; and (block 640). For example, the network device (e.g., using switching component 310, controller 320, and/or the like) may select a secondary path from the paths identified in the attribute, as described above in connection with FIGS. 1A-2. In some implementations, the secondary path may be selected based on determining that the primary path is unavailable for routing the traffic to the one of the other network devices, and the secondary path may be associated with one of the OSPF domain of the network or the ISIS domain of the network.

As further shown in FIG. 6, process 600 may include providing the traffic to the one of the other network devices via the secondary path (block 650). For example, the network device (e.g., using switching component 310, output component 315, controller 320, and/or the like) may provide the traffic to the one of the other network devices via the secondary path, as described above in connection with FIGS. 1A-2.

Process 600 may include additional implementations, such as any single implementation or any combination of implementations described below and/or in connection with one or more other processes described elsewhere herein.

In some implementations, the network device may provide the attribute to the other network devices of the network. In some implementations, the attribute may include information identifying a first secondary path only in the ISIS domain of the network, a second secondary path only in the OSPF domain of the network, a third secondary path that is in the ISIS domain of the network when the ISIS domain is available or is in the OSPF domain of the network when the ISIS domain is unavailable, a fourth secondary path that is in the OSPF domain of the network when the OSPF domain is available or is in the ISIS domain of the network when the OSPF domain is unavailable, and/or the like. In some implementations, the attribute includes a resource reservation protocol (RSVP) session attribute.

In some implementations, the network device may receive additional traffic destined for the one of the other network devices, may determine that the primary path is available for routing the additional traffic to the one of the other network devices, and may provide the additional traffic to the one of the other network devices, via the primary path, based on determining that the primary path is available for routing the additional traffic to the one of the other network devices.

In some implementations, the network device may receive additional traffic destined for the one of the other network devices of the network, may determine that the primary path is unavailable for routing the additional traffic to the one of the other network devices, and may select another secondary path from the paths identified in the attribute. The other secondary path may be different than the secondary path, may be selected based on determining that the primary path is unavailable for routing the additional traffic to the one of the other network devices, and may be associated with one of the OSPF domain of the network or the ISIS domain of the network. The network device may provide the additional traffic to the one of the other network devices via the other secondary path.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a network device of a network, an attribute identifying paths associated with an open shortest path first (OSPF) domain of the network and an intermediate system to intermediate system (ISIS) domain of the network, wherein the attribute includes a resource reservation protocol (RSVP) session attribute,
    wherein the attribute includes information identifying one or more of:
      a secondary path that is in the ISIS domain of the network when the ISIS domain is available or is in the OSPF domain of the network when the ISIS domain is unavailable, or
      a secondary path that is in the OSPF domain of the network when the OSPF domain is available or is in the ISIS domain of the network when the OSPF domain is unavailable;
  providing, by the network device, the attribute to other network devices of the network;
  receiving, by the network device, traffic destined for one of the other network devices of the network;
  determining, by the network device, that a primary path is unavailable for routing the traffic to the one of the other network devices;
  selecting, by the network device, a secondary path from the paths identified by the attribute,
    wherein the secondary path is selected based on determining that the primary path is unavailable for routing the traffic to the one of the other network devices, and
    wherein the secondary path is associated with one of:
      the OSPF domain of the network, or
      the ISIS domain of the network; and
  providing, by the network device, the traffic to the one of the other network devices via the secondary path.

2. The method of claim 1, wherein the attribute includes additional information identifying one or more of:
  a first secondary path only in the ISIS domain of the network, or
  a second secondary path only in the OSPF domain of the network.

3. The method of claim 1, wherein the attribute is stored in a data structure associated with the network device and the other network devices.

4. The method of claim 1, further comprising:
  receiving additional traffic destined for the one of the other network devices;
  determining that the primary path is available for routing the additional traffic to the one of the other network devices; and
  providing the additional traffic to the one of the other network devices, via the primary path, based on determining that the primary path is available for routing the additional traffic to the one of the other network devices.

5. The method of claim 1, wherein:
  the OSPF domain of the network includes:
    clusters of network devices that include one or more of the network device or the other network devices, and
    intra-cluster paths that utilize an OSPF protocol; and
  the ISIS domain of the network includes inter-cluster paths that utilize an ISIS protocol.

6. The method of claim 1, further comprising:
  receiving additional traffic destined for the one of the other network devices of the network;
  determining that the primary path is unavailable for routing the additional traffic to the one of the other network devices;
  selecting another secondary path from the paths identified in the attribute,
    wherein the other secondary path is different than the secondary path,
    wherein the other secondary path is selected based on determining that the primary path is unavailable for routing the additional traffic to the one of the other network devices, and
    wherein the other secondary path is associated with one of:
      the OSPF domain of the network, or
      the ISIS domain of the network; and
  providing the additional traffic to the one of the other network devices via the other secondary path.

7. A network device, comprising:
  one or more memories; and
  one or more processors to:
  receive an attribute identifying paths associated with an open shortest path first (OSPF) domain of a network and an intermediate system to intermediate system (ISIS) domain of the network, wherein the attribute includes a resource reservation protocol (RSVP) session attribute,
    wherein the attribute includes information identifying one or more of:
      a secondary path that is in the ISIS domain of the network when the ISIS domain is available or is in the OSPF domain of the network when the ISIS domain is unavailable, or
      a secondary path that is in the OSPF domain of the network when the OSPF domain is available or is in the ISIS domain of the network when the OSPF domain is unavailable;
  receive traffic destined for one of other network devices of the network;
  determine whether a primary path is available for routing the traffic to the one of the other network devices; and selectively provide the traffic to the one of the other network devices via the primary path or via a secondary path,
> wherein the traffic is provided to the one of the other network devices via the primary path when the primary path is available for routing the traffic to the one of the other network devices,
> wherein the traffic is provided to the one of the other network devices via the secondary path when the primary path is unavailable for routing the traffic to the one of the other network devices,
> wherein the secondary path is selected from the paths identified by the attribute, and
> wherein the secondary path is associated with one of:
>> the OSPF domain of the network, or
>> the ISIS domain of the network.

8. The network device of claim 7, wherein the one or more processors are further to:
provide the attribute to the other network devices of the network.

9. The network device of claim 7, wherein the attribute includes additional information identifying one or more of:
a first secondary path only in the ISIS domain of the network, or
a second secondary path only in the OSPF domain of the network.

10. The network device of claim 7, wherein the attribute is stored in a data structure associated with the network device and the other network devices.

11. The network device of claim 7, wherein:
the OSPF domain of the network includes:
> clusters of network devices that include one or more of the network device or the other network devices, and intra-cluster paths that utilize an OSPF protocol; and the ISIS domain of the network includes inter-cluster paths that utilize an ISIS protocol.

12. The network device of claim 7, wherein the one or more processors are further to:
receive additional traffic destined for the one of the other network devices of the network;
determine that the primary path is unavailable for routing the additional traffic to the one of the other network devices;
select another secondary path from the paths identified in the attribute,
> wherein the other secondary path is different than the secondary path,
> wherein the other secondary path is selected based on determining that the primary path is unavailable for routing the additional traffic to the one of the other network devices, and
> wherein the other secondary path is associated with one of:
>> the OSPF domain of the network, or
>> the ISIS domain of the network; and provide the additional traffic to the one of the other network devices via the other secondary path.

13. A non-transitory computer-readable medium storing instructions, the instructions comprising:
one or more instructions that, when executed by one or more processors of a network device, cause the one or more processors to:
receive an attribute identifying paths associated with an open shortest path first (OSPF) domain of a network and an intermediate system to intermediate system (ISIS) domain of the network, wherein the attribute includes a resource reservation protocol (RSVP) session attribute,
wherein the attribute includes information identifying one or more of:
> a secondary path that is in the ISIS domain of the network when the ISIS domain is available or is in the OSPF domain of the network when the ISIS domain is unavailable, or
> a secondary path that is in the QSPF domain of the network when the QSPF domain is available or is in the ISIS domain of the network when the QSPF domain is unavailable;

receive traffic destined for one of other network devices of the network;
determine that a primary path is unavailable for routing the traffic to the one of the other network devices;
select a secondary path from the paths identified in the attribute,
> wherein the secondary path is selected based on determining that the primary path is unavailable for routing the traffic to the one of the other network devices, and
> wherein the secondary path is associated with one of:
>> the OSPF domain of the network, or
>> the ISIS domain of the network; and provide the traffic to the one of the other network devices via the secondary path.

14. The non-transitory computer-readable medium of claim 13, wherein the instructions further comprise:
one or more instructions that, when executed by the one or more processors, cause the one or more processors to:
provide the attribute to the other network devices of the network.

15. The non-transitory computer-readable medium of claim 13, wherein the attribute includes additional information identifying one or more of:
a first secondary path only in the ISIS domain of the network, or
a second secondary path only in the OSPF domain of the network.

16. The non-transitory computer-readable medium of claim 13, wherein the instructions further comprise:
one or more instructions that, when executed by the one or more processors, cause the one or more processors to:
receive additional traffic destined for the one of the other network devices;
determine that the primary path is available for routing the additional traffic to the one of the other network devices; and
provide the additional traffic to the one of the other network devices, via the primary path, based on determining that the primary path is available for routing the additional traffic to the one of the other network devices.

17. The non-transitory computer-readable medium of claim 13, wherein the instructions further comprise:
one or more instructions that, when executed by the one or more processors, cause the one or more processors to:
receive additional traffic destined for the one of the other network devices of the network;
determine that the primary path is unavailable for routing the additional traffic to the one of the other network devices;

select another secondary path from the paths identified in the attribute,
  wherein the other secondary path is different than the secondary path,
  wherein the other secondary path is selected based on determining that the primary path is unavailable for routing the additional traffic to the one of the other network devices, and
  wherein the other secondary path is associated with one of:
    the OSPF domain of the network, or
    the ISIS domain of the network; and
provide the additional traffic to the one of the other network devices via the other secondary path.

* * * * *

UNITED STATES PATENT AND TRADEMARK OFFICE
CERTIFICATE OF CORRECTION

PATENT NO. : 10,833,973 B1
APPLICATION NO. : 16/277642
DATED : November 10, 2020
INVENTOR(S) : Krishna K. Verma et al.

Page 1 of 1

It is certified that error appears in the above-identified patent and that said Letters Patent is hereby corrected as shown below:

In the Claims

Claim 13:
Column 18, Line 10 change "a secondary path that is in the QSPF domain of the" to --secondary path that is in the OSPF domain of the--
Column 18, Line 11 change "network when the QSPF domain is available or is" to --network when the OSPF domain is available or is--
Column 18, Line 12 change "in the ISIS domain of the network when the QSPF" to --in the ISIS domain of the network when the OSPF--

Signed and Sealed this
Twenty-ninth Day of December, 2020

Andrei Iancu
*Director of the United States Patent and Trademark Office*